(12) United States Patent
Persson et al.

(10) Patent No.: US 11,002,861 B2
(45) Date of Patent: May 11, 2021

(54) PHOTON-COUNTING X-RAY DETECTOR SYSTEM HAVING AN ADAPTIVE ANTI-COINCIDENCE SYSTEM

(71) Applicant: Prismatic Sensors AB, Stockholm (SE)

(72) Inventors: Mats Persson, Vasterhaninge (SE); Mats Danielsson, Taby (SE); Cheng Xu, Taby (SE)

(73) Assignee: PRISMATIC SENSORS AB, Stockholm (SE)

( * ) Notice: Subject to any disclaimer, the term of this patent is extended or adjusted under 35 U.S.C. 154(b) by 139 days.

(21) Appl. No.: 16/296,821

(22) Filed: Mar. 8, 2019

(65) Prior Publication Data
US 2019/0204456 A1   Jul. 4, 2019

Related U.S. Application Data

(62) Division of application No. 15/481,045, filed on Apr. 6, 2017, now Pat. No. 10,422,887.

(51) Int. Cl.
| | | |
|---|---|---|
| *G01T 1/172* | (2006.01) | |
| *G01T 1/24* | (2006.01) | |
| *G01T 1/17* | (2006.01) | |

(52) U.S. Cl.
CPC ............ *G01T 1/172* (2013.01); *G01T 1/17* (2013.01); *G01T 1/247* (2013.01)

(58) Field of Classification Search
CPC ............ G01T 1/172; G01T 1/17; G01T 1/247
See application file for complete search history.

(56) References Cited

U.S. PATENT DOCUMENTS

| | | |
|---|---|---|
| 8,183,535 B2 | 5/2012 | Danielsson et al. |
| 2007/0051892 A1 | 3/2007 | Warburton |
| 2007/0114424 A1 | 5/2007 | Danielsson et al. |
| 2010/0204942 A1 | 8/2010 | Danielsson |
| 2010/0215230 A1 | 8/2010 | Bornefalk et al. |

(Continued)

FOREIGN PATENT DOCUMENTS

| | | |
|---|---|---|
| JP | 2013-170922 | 9/2013 |
| WO | 2007/058600 A1 | 5/2007 |

(Continued)

OTHER PUBLICATIONS

Fredenberg et al. Energy resolution of a photon-counting silicon strip detector, Nuclear Instruments and Methods in Physics Research A vol. 613, No. 1, pp. 156-162 (Year: 2009).*

(Continued)

*Primary Examiner* — David P Porta
*Assistant Examiner* — Shun Lee
(74) *Attorney, Agent, or Firm* — Nixon & Vanderhye

(57) ABSTRACT

There is provided a photon-counting x-ray detector system (200) comprising a plurality of photon-counting channels (220), and at least one anti-coincidence circuit (230), each of which is connected to least two of the channels and configured to detect coincident events in the connected channels. The x-ray detector system (200) further comprises an anti-coincidence controller (240) configured to control the operation of said at least one anti-coincidence circuit based on photon count information by gradually adapting the operation of said at least one anti-coincidence circuit with increasing count rates, starting from a threshold count rate.

19 Claims, 12 Drawing Sheets

(56) References Cited

U.S. PATENT DOCUMENTS

| | | | |
|---|---|---|---|
| 2015/0090893 A1* | 4/2015 | Spahn | G01T 1/17 250/394 |
| 2015/0323685 A1 | 11/2015 | Nelson et al. | |
| 2016/0282476 A1* | 9/2016 | Kappler | G01T 1/17 |
| 2017/0086761 A1 | 3/2017 | Fu et al. | |

FOREIGN PATENT DOCUMENTS

| | | |
|---|---|---|
| WO | 2014173812 | 10/2014 |
| WO | 2017032548 | 3/2017 |

OTHER PUBLICATIONS

Xu et al. Preliminary evaluation of a silicon strip detector for photon-counting spectral CT, Nuclear Instruments and Methods in Physics Research Section A vol. 677, No., pp. 45-5111 (Year: 2012).*

Roessl, E. et al., "K-edge imaging in x-ray computed tomography using multi-bin photon counting detectors," Physics in Medicine and Biology, vol. 52, 2007, pp. 4679-4696.

Alvarez, Robert E. et al., "Energe-Selective Reconstruction in X-ray Computerized Tomography," Physics in Medicine and Biology, 1976, vol. 21, No. 5, pp. 733-744.

Ballabriga, R., et al., "The Medipix3RX: a high resolution, zero dead-time pixel detector readout chip allowing spectroscopic imaging," Journal of Instrumentation, Feb. 8, 2013.

Bornefalk, Hans et al., "Photon-counting spectral computer tomography using silicon strip detectors: a feasibility study," Physics in Medicine and Biology, vol. 55, 2010, pp. 1999-2022.

Bornefalk, Hans et al., "Effect of Temperature Variation on the Energy Response of a Photon Counting Silicon CT Detector," IEEE Transactions on Nuclear Science, vol. 60, No. 2, Apr. 2013, pp. 1442-1449.

Bornefalk, Hans et al., "Design considerations to overcome cross talk in a photon counting silicon strip detector for computed tomography," Nuclear Instruments and Methods in Physics Research, vol. 621, 2010, pp. 371-378.

Gustavsson, Mikael et al., "A High-Rate Energy-Resolving Photon-Counting ASIC for Spectral Computed Tomography," 2012, IEEE Transactions on Nuclear Science, vol. 59, No. 1, pp. 30-39.

Iwanczyk, Jan S. et al., "Optimization of Room-Temperature Semiconductor Detectors for Energy-Resolved X-Ray Imaging," 2011 IEEE Nuclear Science Symposium Conference Record, pp. 4745-4750.

Liu, Xuejin et al., "A Silicon-Strip Detector for Photon-Counting Spectral CT: Energy Resolution From 40 keV to 120 keV," EEE Transactions on Nuclear Science, vol. 61, No. 3, pp. 1099-1105, Jun. 2014.

Liu, X. et al., "Count rate performance of a silicon-strip detector for photon-counting spectral CT," Nuclear Instruments and Methods in Physics Research, vol. 827, 2016, pp. 102-106.

Roessl, Ewald et al., "Edge-on semiconductor x-ray detectors—towards high-rate counting computed tomography," 2008 IEEE Nuclear Science Symposium Conference Record, pp. 1748-1751.

Thomas Koenig, et al., Charge Summing in Spectroscopic X-Ray Detectors With High-Z Sensors, IEEE Transactions on Nuclear Science, Dec. 2013, pp. 4713-4718, vol. 60, No. 6.

Mats Danielsson, et al., Dose-Efficient System for Digital Mammography, Medical Imaging 2000: Physics of Medical Imaging, Proceedings of SPIE, 2000, pp. 239-249, vol. 3977.

R. Nowotny, Application of Si-Microstrip-Detectors in Medicine and Structural Analysis, Nuclear Instruments and Methods in Physics Research 226, 1984, pp. 34-39, Elsevier Science Publishers B.V., North-Holland, Amsterdam.

Shoichi Yoshida, et al., Application of silicon strip detectors to X-ray computed tomography, Nuclear Instruments and Methods in Physics Research A 541, 2005, pp. 412-420, Elsevier B.V.

"Characteristic performance evaluation of a photon counting Si strip detector for low dose spectral breast CT imaging", Med Phys. Sep. 2014: 41(9), Published online Aug. 13, 2014, p. 1-13.

Extended European Search Report issued in European Patent Application No. 18781264.9 dated Oct. 26, 2020.

* cited by examiner

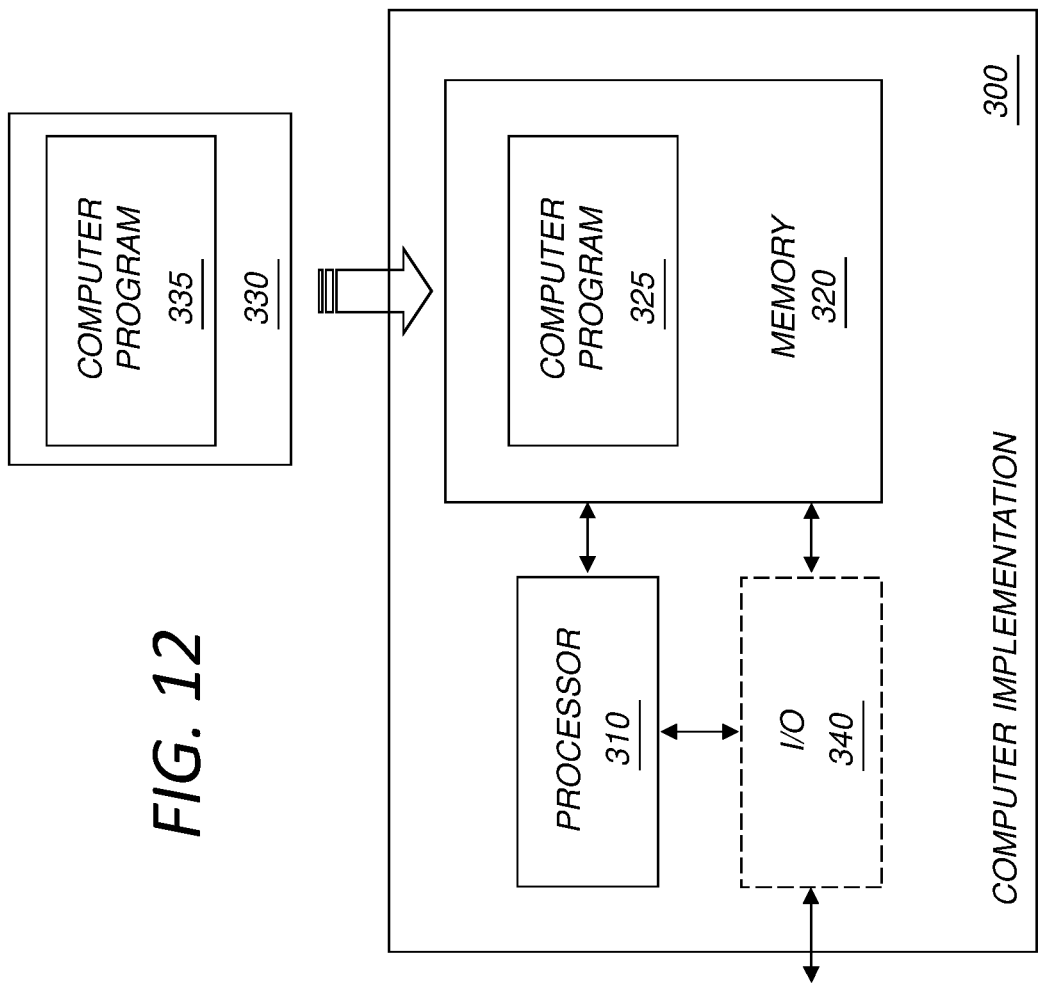

PHOTON-COUNTING X-RAY DETECTOR SYSTEM HAVING AN ADAPTIVE ANTI-COINCIDENCE SYSTEM

TECHNICAL FIELD

The present invention generally relates to x-ray imaging and x-ray detector systems, and more particularly to a photon-counting x-ray detector system, an anti-coincidence system for a photon-counting x-ray detector system as well as a controller for such an anti-coincidence system and a corresponding computer-program product.

BACKGROUND

Radiographic imaging such as x-ray imaging has been used for years in medical applications and for non-destructive testing.

Normally, an x-ray imaging system includes an x-ray source and an x-ray detector system. The x-ray source emits x-rays, which pass through a subject or object to be imaged and are then registered by the x-ray detector system. Since some materials absorb a larger fraction of the x-rays than others, an image is formed of the subject or object. The x-ray detector may be of different types, including energy-integrating detectors and photon-counting detectors.

Performance of x-ray imaging detectors are commonly measured using the detective quantum efficiency (DQE). The DQE is defined as the squared signal to noise in the output from the detection system divided by the squared signal-to-noise ratio of the input to the detector, i.e. divided by the squared signal-to-noise ratio that would be measured by an ideal detector. The DQE is a function of spatial frequency in the image. Higher DQE corresponds to better detector performance and less noise in the measured image.

A problem in photon-counting x-ray imaging is that a single photon may cause a pulse to be counted in more than one detector element, sometimes also referred to as a detector pixel or simply pixel, as will be explained later on. This can be caused by several mechanisms. One such mechanism is charge sharing, where the charge cloud generated by a photon interaction is collected by more than one electrode. Another such mechanism is Compton scatter, which causes a photon to deposit energy in a first pixel and then propagate to a second pixel and deposit more energy there. A third mechanism that can cause double counting is fluorescence where an original x-ray photon interaction in a first pixel leaves an inner electron shell of an atom in an excited state, which is subsequently de-excited by the emission of a fluorescence photon, which is reabsorbed in a second pixel. This means that a fraction of the events are counted twice, and since this happens randomly, it degrades the DQE of the detector, thereby giving increased image noise. Furthermore, double-counting of photons can cause blurring of the image and degrade energy resolution. It is thus an objective to register each photon only once, with the correct photon energy and in the original pixel of interaction.

To achieve this objective, it may be beneficial to implement anti-coincidence logic in the x-ray detector. This anti-coincidence logic can detect simultaneous events and ensure that simultaneous pulses caused by the same photon is only counted once. Such schemes may furthermore be refined so that they use the information contained in the registered set of pulse heights to estimate the original position of interaction and the original photon energy.

A problem with anti-coincidence logic schemes is that they may identify pulses generated by two photons arriving close to each other in time incorrectly, as generated by a single photon. This is called false coincidence, as opposed to true coincidence which is when the anti-coincidence logic correctly identifies two pulses as generated by the same original photon.

False coincidence causes loss of counts and therefore degrades DQE and increases image noise. Furthermore, false coincidence can distort the energy information if the energies of the coincident photons are summed together. If the probability of false coincidence is large enough, the detrimental effect of false coincidence may outweigh the benefits of photon counting.

For a photon-counting detector to be useful in specific applications, such as Computed Tomography (CT), the detector must be able to handle the count rates occurring in the application.

U.S. Pat. No. 6,559,453 relates to a method of enhancing contrast information in x-ray imaging wherein the signals from the photons are given a weight that is influenced by the possibility of charge sharing between adjacent sensor elements.

U.S. Pat. No. 7,214,944 relates to a radiation detection device which compares the temporal overlap of signals from different detector elements, with the objective of making it possible to distinguish real events from false events at high count rates.

U.S. Pat. No. 7,473,902 relate to a method for taking radiographs where charge pulses of bordering pixel units are added together to a total charge pulse.

U.S. Pat. No. 8,050,385 relates to a coincidence detection unit with parameters and thresholds that may have to be adjusted such that the advantage from detecting coincidences is greater than the disadvantage from incorrectly removing false double counts.

U.S. Pat. No. 9,031,197 relates to a method for detecting true coincidence of charge pulses, by allocating the height of the pulses to one of several intervals and analyzing the combination of allocations to intervals in adjacent picture elements.

The publication T. Koenig et al. "Charge Summing in Spectroscopic X-Ray Detectors with High-Z Sensors", IEEE Transactions on Nuclear Science 60 (6), pp. 4713-4718, 2013, relates to an anti-coincidence logic implementation based on the summation of collected charge in adjacent pixels. This anti-coincidence logic gives improved reconstruction of the incident energy spectrum at low photon fluxes, but causes severe count loss at higher fluxes, above $5 \cdot 10^6$ counts/mm$^2 \cdot$s.

U.S. Pat. No. 9,207,332 relates to an x-ray detector with a low-flux mode where charges collected by neighboring pixels are summed together before being digitized by comparators, and a high-flux mode where no summing of charges from neighboring pixels is made before the signal is digitized by the comparators, but the resulting counts in neighboring pixels are summed together after digitization.

US Patent Application 20160282476A1 relates to an x-ray detector with two counting modes, which initially measures a first count in a first counting mode and, based upon this count value measures a second count value in a second counting mode.

There is however still a need for a detector with improved anti-coincidence logic which gives good image quality both for low and high incident photon flux.

SUMMARY

It is thus a general object to provide improved anti-coincidence logic for a photon-counting x-ray detector system.

It is a specific object to provide a photon-counting x-ray detector system.

Another object is to provide an anti-coincidence system for a photon-counting x-ray detector system.

Yet another object is to provide a controller for an anti-coincidence system of a photon-counting x-ray detector system.

Still another object is to provide a corresponding computer-program product.

These and other objects are met by embodiments of the proposed technology.

According to a first aspect there is provided a photon-counting x-ray detector system comprising a plurality of photon-counting channels, and at least one anti-coincidence circuit, each of which is connected to least two of the channels and configured to detect coincident events in the connected channels. The x-ray detector system further comprises an anti-coincidence controller configured to control the operation of said at least one anti-coincidence circuit based on photon count information by gradually adapting the operation of said at least one anti-coincidence circuit with increasing count rates, starting from a threshold count rate.

In this way, the proposed technology provides good image quality independent of the incident photon flux rates. The inventors have recognized that abrupt changes of the operation of the anti-coincidence circuit(s) based on measured count rates may cause artifacts in the x-ray images, and that a gradual adaptation of the operation of the anti-coincidence circuit(s) with increasing count rates eliminates or at least reduces such artifacts in the images.

In particular, the proposed technology makes it possible to gradually limit the influence of the anti-coincidence circuit (s) with increasing count rates, e.g. to provide a smooth count rate characteristics, thereby avoiding image artifacts.

According to a second aspect there is provided an anti-coincidence system for a photon-counting x-ray detector system having a plurality of photon-counting readout channels, wherein the anti-coincidence system comprises at least one anti-coincidence circuit, each of which is connected to least two of the channels and configured to detect coincident events in the connected channels. The anti-coincidence system further comprises an anti-coincidence controller configured to control the operation of said at least one anti-coincidence circuit based on photon count information by gradually adapting the operation of said at least one anti-coincidence circuit with increasing count rates, starting from a threshold count rate.

According to a third aspect there is provided a controller for an anti-coincidence system of a photon-counting x-ray detector system having a plurality of photon-counting read-out channels, wherein the anti-coincidence system comprises at least one anti-coincidence circuit, each of which is connected to least two of the channels and configured to detect coincident events in the connected channels. The controller is configured to control the operation of said at least one anti-coincidence circuit based on photon count information by gradually adapting the operation of said at least one anti-coincidence circuit with increasing count rates, starting from a threshold count rate.

According to a fourth aspect there is provided a computer-program product comprising a computer-readable medium having stored thereon a computer program for controlling, when executed by a processor, an anti-coincidence system of a photon-counting x-ray detector system having a plurality of photon-counting readout channels. The anti-coincidence system comprises at least one anti-coincidence circuit, each of which is connected to least two of the channels and configured to detect coincident events in the connected channels. The computer program comprises instructions, which when executed by the processor, cause the processor to control the operation of said at least one anti-coincidence circuit based on photon count information by gradually adapting the operation of said at least one anti-coincidence circuit with increasing count rates, starting from a threshold count rate.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIG. 12 is a schematic diagram illustrating an example of a computer-implementation according to an embodiment.

DETAILED DESCRIPTION

Figure 1:
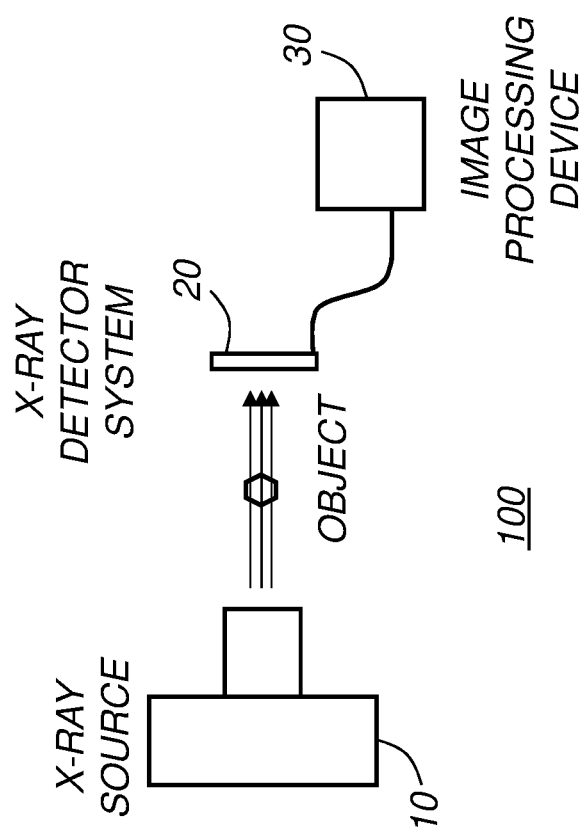
FIG. 1 is a schematic diagram illustrating an example of an overall x-ray imaging system.

It may be useful to begin with a brief overview of an illustrative overall x-ray imaging system, with reference to FIG. 1. In this non-limiting example, the x-ray imaging system 100 basically comprises an x-ray source 10, an x-ray detector system 20 and an associated image processing device 30. In general, the x-ray detector system 20 is configured for registering radiation from the x-ray source 10 that may have been focused by optional x-ray optics and passed an object or subject or part thereof. The x-ray detector system 20 is connectable to the image processing device 30 via suitable analog processing and read-out electronics (which may be integrated in the x-ray detector system 20) to enable image processing and/or image reconstruction by the image processing device 30.

Figure 2:
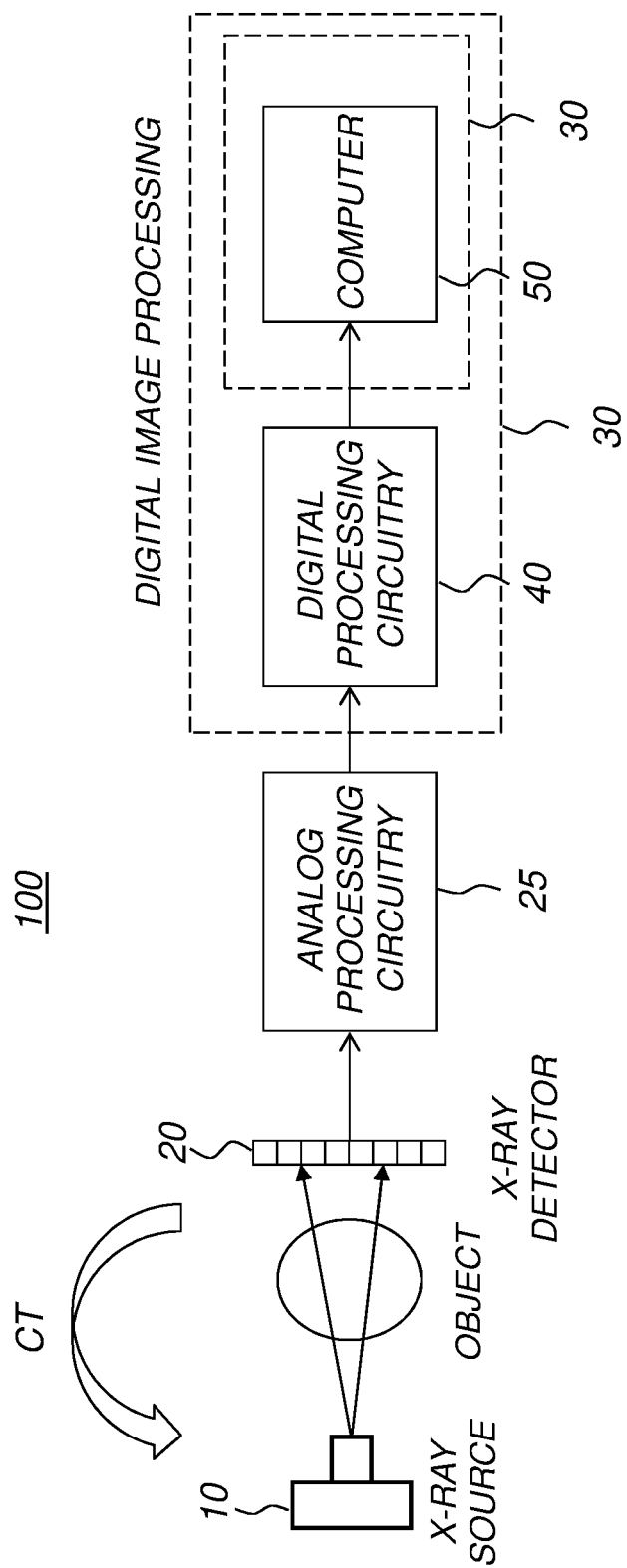
FIG. 2 is a schematic diagram illustrating another example of an x-ray imaging system.

As illustrated in FIG. 2, another example of an x-ray imaging system 100 comprises an x-ray source 10, which emits x-rays; an x-ray detector system 20, which detects the x-rays after they have passed through the object; analog processing circuitry 25, which processes the raw electrical signal from the detector and digitizes it; digital processing circuitry 40 which may carry out further processing operations on the measured data such as applying corrections, storing it temporarily, or filtering; and a computer 50 which stores the processed data and may perform further post-processing and/or image reconstruction.

The overall detector may be regarded as the x-ray detector system 20, or the x-ray detector system 20 combined with the associated analog processing circuitry 25.

The digital part including the digital processing circuitry 40 and/or the computer 50 may be regarded as a digital image processing system 30, which performs image reconstruction based on the image data from the x-ray detector. The image processing system 30 may thus be seen as the computer 50, or alternatively the combined system of the digital processing circuitry 40 and the computer 50, or possibly the digital processing circuitry 40 by itself if the digital processing circuitry is further specialized also for image processing and/or reconstruction.

An example of a commonly used x-ray imaging system is a Computed Tomography (CT) system, which may include an x-ray source that produces a fan or cone beam of x-rays and an opposing x-ray detector system for registering the fraction of x-rays that are transmitted through a patient or object. The x-ray source and detector system are normally mounted in a gantry that rotates around the imaged object.

Accordingly, the x-ray source 10 and the x-ray detector system 20 illustrated in FIG. 2 may thus be arranged as part of a CT system, e.g. mountable in a CT gantry.

A challenge for x-ray imaging detectors is to extract maximum information from the detected x-rays to provide input to an image of an object or subject where the object or subject is depicted in terms of density, composition and structure. It is still common to use film-screen as detector but most commonly the detectors today provide a digital image.

Modern x-ray detectors normally need to convert the incident x-rays into electrons, this typically takes place through photo absorption or through Compton interaction and the resulting electrons are usually creating secondary visible light until its energy is lost and this light is in turn detected by a photo-sensitive material. There are also detectors, which are based on semiconductors and in this case the electrons created by the x-ray are creating electric charge in terms of electron-hole pairs which are collected through an applied electric field.

Conventional x-ray detectors are energy integrating, the contribution from each detected photon to the detected signal is therefore proportional to its energy, and in conventional CT, measurements are acquired for a single energy distribution. The images produced by a conventional CT system therefore have a certain look, where different tissues and materials show typical values in certain ranges.

Photon counting detectors have also emerged as a feasible alternative in some applications; currently those detectors are commercially available mainly in mammography. The photon counting detectors have an advantage since in principle the energy for each x-ray can be measured which yields additional information about the composition of the object. This information can be used to increase the image quality and/or to decrease the radiation dose.

Compared to the energy-integrating systems, photon-counting CT has the following advantages. Firstly, electronic noise that is integrated into the signal by the energy-integrating detectors can be rejected by setting the lowest energy threshold above the noise floor in the photon-counting detectors. Secondly, energy information can be extracted by the detector, which allows improving contrast-to-noise ratio by optimal energy weighting and which also allows so-called material basis decomposition, by which different materials and/or components in the examined subject or object can be identified and quantified, to be implemented effectively. Thirdly, more than two basis materials can be used which benefits decomposition techniques, such as K-edge imaging whereby distribution of contrast agents, e.g. iodine or gadolinium, are quantitatively determined. Fourth, there is no detector afterglow, meaning that high angular resolution can be obtained. Last but not least, higher spatial resolution can be achieved by using smaller pixel size.

The most promising materials for photon-counting x-ray detectors are cadmium telluride (CdTe), cadmium zinc telluride (CZT) and silicon (Si). CdTe and CZT are employed in several photon-counting spectral CT projects for the high absorption efficiency of high-energy x-rays used in clinical CT. However, these projects are slowly progressing due to several drawbacks of CdTe/CZT. CdTe/CZT have low charge carrier mobility, which causes severe pulse pileup at flux rates ten times lower than those encountered in clinical practice. One way to alleviate this problem is to decrease the pixel size, whereas it leads to increased spectrum distortion as a result of charge sharing and K-escape. Also, CdTe/CZT suffer from charge trapping, which would lead to polarization that causes a rapid drop of the output count rate when the photon flux reaches above a certain level.

In contrast, silicon has higher charge carrier mobility and is free from the problem of polarization. The mature manufacturing process and comparably low cost are also its advantages. But silicon has limitations that CdTe/CZT does not have. Silicon sensors must accordingly be quite thick to compensate for its low stopping power. Typically, a silicon sensor needs a thickness of several centimeters to absorb most of the incident photons, whereas CdTe/CZT needs only several millimeters. On the other hand, the long attenuation path of silicon also makes it possible to divide the detector into different depth segments, as will be explained below. This in turn makes it possible for a silicon-based photon-counting detector to properly handle the high fluxes in CT.

When using simple semiconductor materials, such as silicon or germanium, Compton scattering causes many x-ray photons to convert from a high energy to a low energy before conversion to electron-hole pairs in the detector. This results in a large fraction of the x-ray photons, originally at a higher energy, producing much less electron-hole pairs than expected, which in turn results in a substantial part of the photon flux appearing at the low end of the energy distribution. In order to detect as many of the x-ray photons as possible, it is therefore necessary to detect as low energies as possible.

Figure 3:
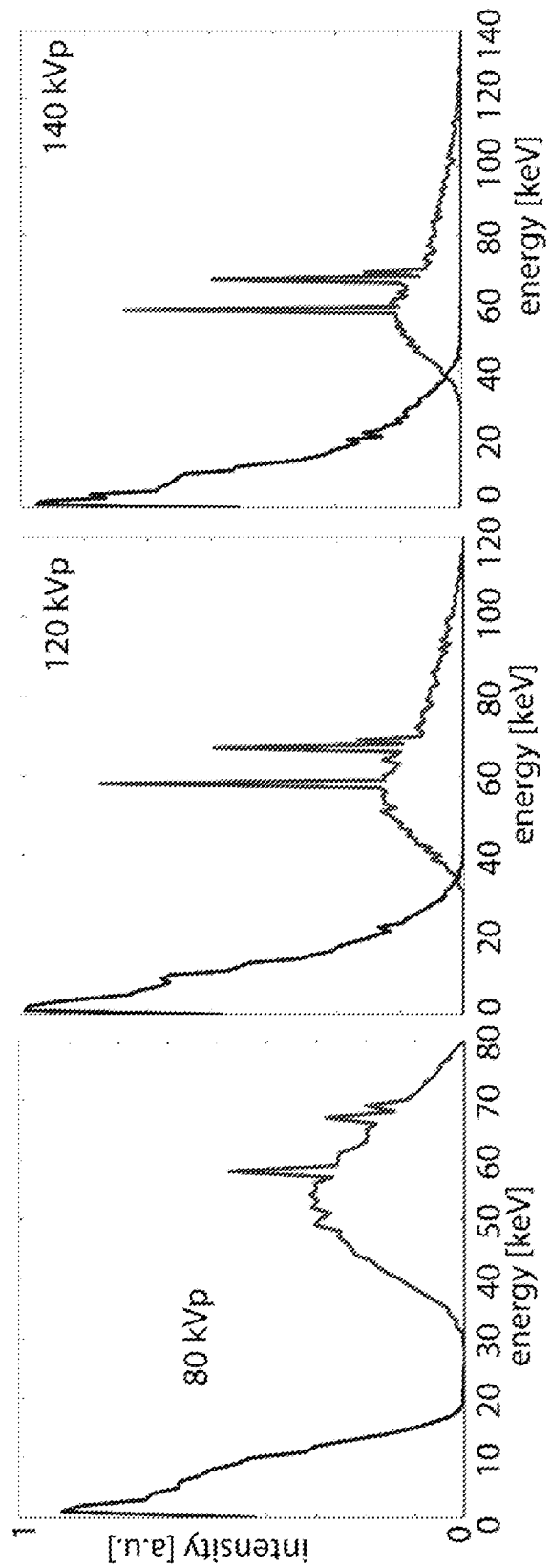
FIG. 3 is a schematic diagram illustrating examples of the energy spectrum for three different x-ray tube voltages.

FIG. 3 is a schematic diagram illustrating examples of the energy spectrum for three different x-ray tube voltages. The energy spectrum is built up by deposited energies from a mix of different types of interactions, including Compton events at the lower energy range and photoelectric absorption events at the higher energy range.

A further development of x-ray imaging is energy-resolved x-ray imaging, also known as spectral x-ray imaging, where the x-ray transmission is measured for several different energy levels. This can be achieved by letting the source switch rapidly between two different emission spectra, by using two or more x-ray sources emitting different x-ray spectra, or by using an energy-discriminating detector which measures the incoming radiation in two or more energy levels, also referred to as energy bins.

Figure 4:
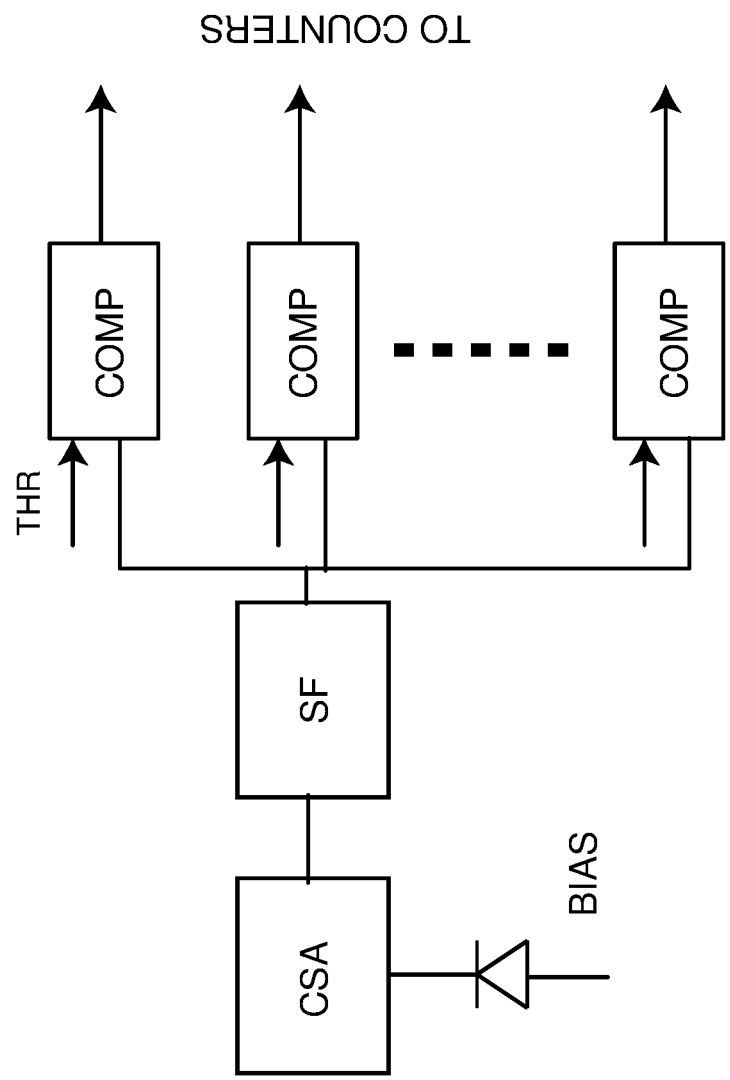
FIG. 4 is a schematic diagram illustrating an example of a photon counting mechanism.

In the following, a brief description of an example of an energy-discriminating photon-counting detector is given with reference to FIG. 4. In this example, each registered photon generates a current pulse which is compared to a set of thresholds, thereby counting the number of photons incident in each of a number of energy bins.

In general, the x-ray photons, including also photons after Compton scattering, are converted to electron-hole pairs inside the semiconductor detector, where the number of electron-hole pairs is generally proportional to the photon energy. The electrons and holes are then drifting towards the detector electrodes, then leaving the detector. During this drift, the electrons and holes induce an electrical current in the electrode, a current which may be measured, e.g. through a Charge Sensitive Amplifier (CSA), followed by a Shaping Filter (SF), as schematically illustrated in FIG. 4.

As the number of electrons and holes from one x-ray event is proportional to the x-ray energy, the total charge in one induced current pulse is proportional to this energy. The current pulse is amplified in the CSA and then filtered by the SF filter. By choosing an appropriate shaping time of the SF filter, the pulse amplitude after filtering is proportional to the total charge in the current pulse, and therefore proportional to the x-ray energy. Following the SF filter, the pulse amplitude is measured by comparing its value with one or several threshold values (Thr) in one or more comparators (COMP), and counters are introduced by which the number of cases when a pulse is larger than the threshold value may be recorded. In this way it is possible to count and/or record the number of X-ray photons with an energy exceeding an energy corresponding to respective threshold value (Thr) which has been detected within a certain time frame.

When using several different threshold values, a so-called energy-discriminating detector is obtained, in which the detected photons can be sorted into energy bins corresponding to the various threshold values. Sometimes, this type of detector is also referred to as a multi-bin detector.

In general, the energy information allows for new kinds of images to be created, where new information is available and image artifacts inherent to conventional technology can be removed.

In other words, for an energy-discriminating detector, the pulse heights are compared to a number of programmable thresholds in the comparators and classified according to pulse-height, which in turn is proportional to energy.

However, an inherent problem in any charge sensitive amplifier is that it will add electronic noise to the detected current. In order to avoid detecting noise instead of real x-ray photons, it is therefore important to set the lowest threshold value (Thr) high enough so that the number of times the noise value exceeds the threshold value is low enough not to disturb the detection of x-ray photons.

By setting the lowest threshold above the noise floor, electronic noise, which is the major obstacle in the reduction of radiation dose of the x-ray imaging systems, can be significantly reduced In order to increase the absorption efficiency, the detector can be arranged edge-on, in which case the absorption depth can be chosen to any length and the detector can still be fully depleted without going to very high voltages.

In particular, silicon has many advantages as detector material such as high purity and a low energy required for creation of charge carriers (electron-hole pairs) and a also a high mobility for these charge carriers which means it will work even for high rates of x-rays. silicon is also readily available in large volumes.

The main challenge with silicon is its low atomic number and low density which means it has to be made very thick for higher energies to be an efficient absorber. The low atomic number also means the fraction of Compton scattered x-ray photons in the detector will dominate over the photo-absorbed photons which will create problem with the scattered photons since they may induce signals in other pixels in the detector which will be equivalent to noise in those pixels. Silicon has however been used successfully in applications with lower energy as is for example outlined by M. Danielsson, H. Bornefalk, B. Cederström, V. Chmill, B. Hasegawa, M. Lundqvist, D. Nygren and T. Tabár, "Dose-efficient system for digital mammography", Proc. SPIE, Physics of Medical Imaging, vol. 3977, pp. 239-249 San Diego, 2000. One way to overcome the problem of low absorption efficiency for silicon is to simply make it very thick, the silicon is produced in wafers which are approximately 500 µm thick and these wafers can be oriented so that the x-rays are incident edge-on and the depth of silicon may be as much as the diameter of the wafer if required.

Another method to make silicon deep enough to get high efficiency is advocated in U.S. Pat. No. 5,889,313 of Sherwood Parker "Three dimensional architecture for solid state radiation detectors" 1999, this is an inventive method but involves some non-standard production methods which may be the reason why it has not been used in commercial imaging detectors.

The first mentioning of crystalline silicon strip detectors in edge-on geometry as an x-ray detector we could find is R. Nowotny: "Application Of Si-Microstrip-Detectors In Medicine And Structural Analysis" Nuclear Instruments and Methods in Physics Research 226 (1984) 34-39. It concludes that silicon will work at low energies such as for breast imaging but not for higher energies such as computed tomography mainly because of the higher fraction of Compton scattering and problems related to this.

The edge-on geometry for semiconductor detectors is also suggested in U.S. Pat. No. 4,937,453 of Robert Nelson "X-ray detector for radiographic imaging", U.S. Pat. No. 5,434,417 of David Nygren "High resolution energy-sensitive digital X-ray" and US Patent Application Publication 2004/0251419 of Robert Nelson. In US 2004/0251419, edge-on detectors are used for so called Compton imaging, in which the energy and direction of the Compton scattered x-ray is measured in order to make an estimation of the energy of the original x-ray. The method of Compton imaging has been much discussed in the literature for a long time but mainly applies to energies higher than what is employed in x-ray imaging, such as Positron Emission Tomography. Compton imaging does not relate to the present invention.

In a paper by S Shoichi Yoshida, Takashi Ohsugi "Application of silicon strip detectors to X-ray computed tomography" Nuclear Instruments and Methods in Physics Research A 541 (2005) 412-420 an implementation of the edge-on concept is outlined. In this implementation thin tungsten plates placed between edge-on silicon strip detector reduces the background of scattered X-rays and improve the image contrast with low dose. The implementation is very similar to what is proposed by R. Nowotny: "Application Of Si-Microstrip-Detectors In Medicine And Structural Analysis" Nuclear Instruments and Methods in Physics Research 226 (1984) 34-39.

Several proposals have been made for photon-counting semiconductor detectors based on high-Z materials such as CdZnTe and clinical images have also been acquired with prototype detectors. The drawback with these materials is the cost and lack of experience in production volumes.

U.S. Pat. No. 8,183,535 discloses an example of a photon-counting edge-on x-ray detector. In this patent, there are multiple semiconductor detector modules arranged together to form an overall detector area, where each semiconductor detector module comprises an x-ray sensor oriented edge-on to incoming x-rays and connected to integrated circuitry for registration of x-rays interacting in the x-ray sensor.

The semiconductor detector modules are normally tiled together to form a full detector of almost arbitrary size with almost perfect geometrical efficiency except for an anti-scatter module which is integrated between at least some of the semiconductor detector modules. Preferably, each anti-scatter module includes a foil of relatively heavy material to prevent most of the Compton scattered x-rays in a semiconductor detector module to reach an adjacent detector module.

Figure 5:
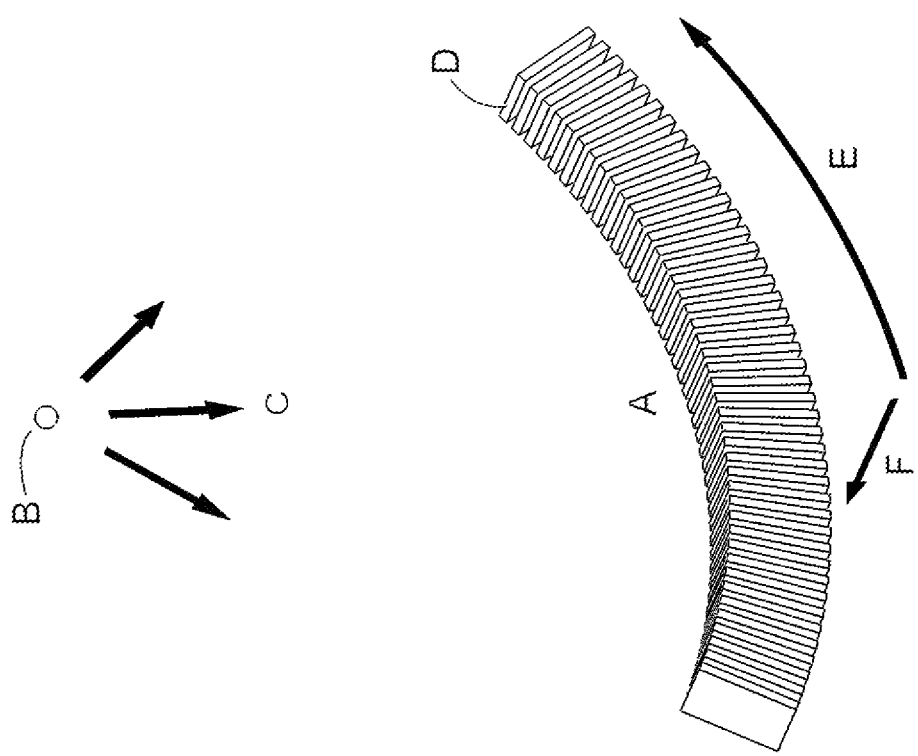
FIG. 5 is a schematic diagram of an X-ray detector according to an exemplary embodiment.

FIG. 5 is a schematic diagram of an X-ray detector according to an exemplary embodiment. In this example there is shown a schematic view of an X-ray detector (A) with x-ray source (B) emitting x-rays (C). The elements of the detector (D) are pointing back to the source, and thus preferably arranged in a slightly curved overall configuration. Two possible scanning motions (E,F) of the detector are indicated. In each scanning motion the source may be stationary or moving, in the scanning motion indicated by (E) the x-ray source and detector may be rotated around an object positioned in between. In the scanning motion indicated with (F) the detector and the source may be translated relative to the object, or the object may be moving. Also in scan motion (E) the object may be translated during the rotation, so called spiral scanning. By way of example, for CT implementations, the x-ray source and detector may be mounted in a gantry that rotates around the object or subject to be imaged.

Figure 6:
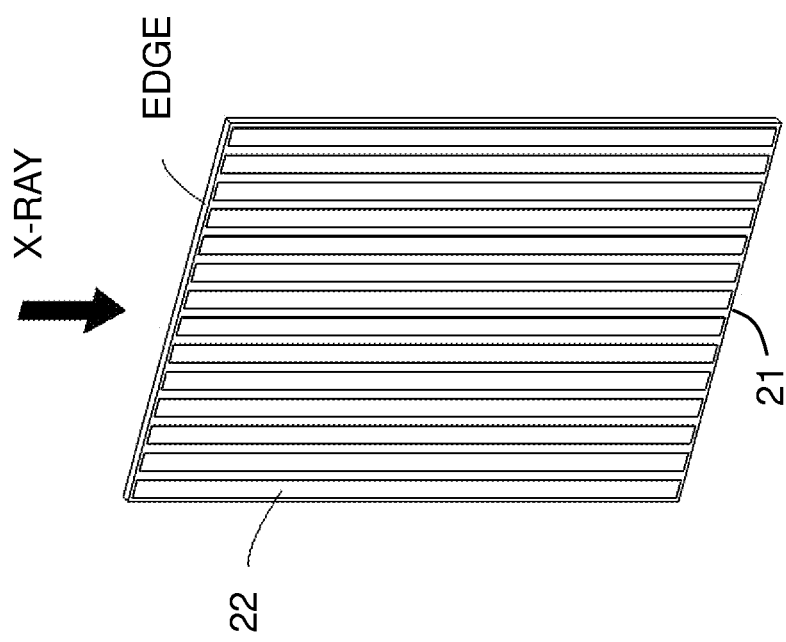
FIG. 6 is a schematic diagram illustrating an example of a semiconductor detector module according to an exemplary embodiment.

FIG. 6 is a schematic diagram illustrating an example of a semiconductor detector module according to an exemplary embodiment. This is an example of a semiconductor detector module with the sensor part 21 split into detector elements or pixels 22, where each detector element (or pixel) is normally based on a diode having a charge collecting electrode as a key component. The x-rays enter through the edge of the semiconductor sensor.

Figure 7:
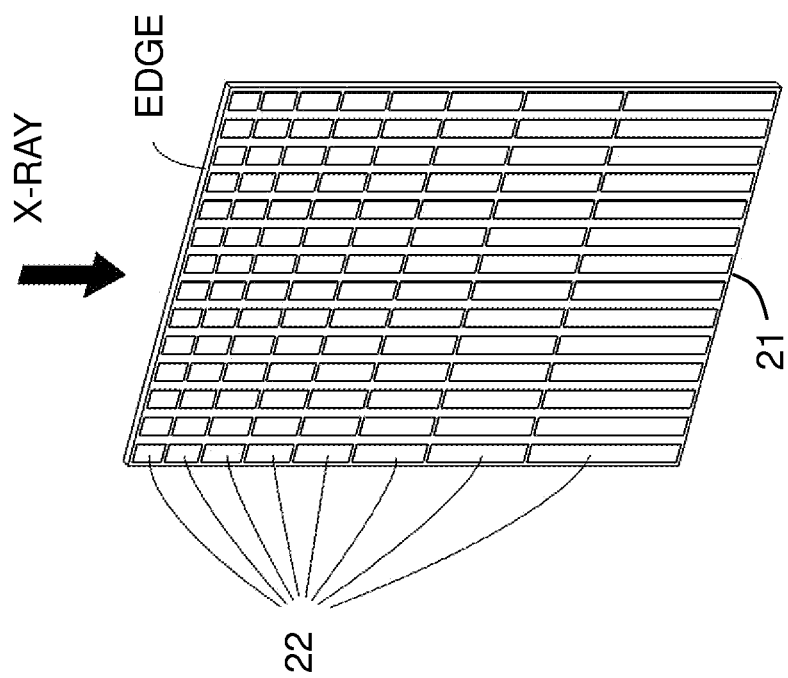
FIG. 7 is a schematic diagram illustrating an example of semiconductor detector module according to another exemplary embodiment.

FIG. 7 is a schematic diagram illustrating an example of semiconductor detector module according to another exemplary embodiment. In this example, the semiconductor sensor part 21 is also split into so-called depth segments 22 in the depth direction, again assuming the x-rays enter through the edge.

Normally, a detector element is an individual x-ray sensitive sub-element of the detector. In general, the photon interaction takes place in a detector element and the thus generated charge is collected by the corresponding electrode of the detector element.

Each detector element typically measures the incident x-ray flux as a sequence of frames. A frame is the measured data during a specified time interval, called frame time.

Depending on the detector topology, a detector element may correspond to a pixel, especially when the detector is a flat-panel detector. A depth-segmented detector may be regarded as having a number of detector strips, each strip having a number of depth segments. For such a depth-segmented detector, each depth segment may be regarded as an individual detector element, especially if each of the depth segments is associated with its own individual charge collecting electrode.

The detector strips of a depth-segmented detector normally correspond to the pixels of an ordinary flat-panel detector. However, it is also possible to regard a depth-segmented detector as a three-dimensional pixel array, where each pixel (sometimes referred to as a voxel) corresponds to an individual depth segment/detector element.

The semiconductor sensors may be implemented as so called Multi-Chip Modules (MCMs) in the sense that the semiconductor sensors are used as base substrates for electric routing and for a number of Application Specific Integrated Circuits (ASICs) which are attached preferably through so called flip-chip technique. The routing will include a connection for the signal from each pixel or detector element to the ASIC input as well as connections from the ASIC to external memory and/or digital data processing. Power to the ASICs may be provided through similar routing taking into account the increase in cross-section which is required for the large currents in these connections, but the power may also be provided through a separate connection. The ASICS may be positioned on the side of the active sensor and this means it can be protected from the incident x-rays if an absorbing cover is placed on top and it can also be protected from scattered x-rays from the side by positioning an absorber also in this direction.

Figure 8:
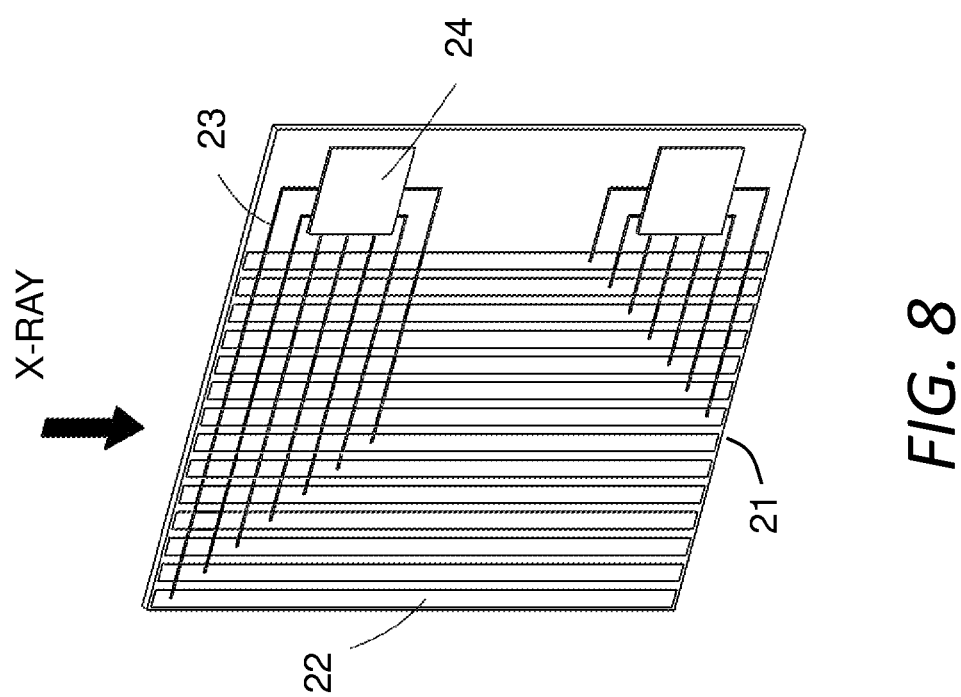
FIG. 8 is a schematic diagram illustrating an example of a semiconductor detector module according to yet another exemplary embodiment.

FIG. 8 is a schematic diagram illustrating an example of a semiconductor detector module. In this example, it is illustrated how the sensor area 21 of the semiconductor detector (module) 20 also can have the function of substrate in a Multi-Chip Module (MCM), similar to embodiments in U.S. Pat. No. 8,183,535. The signal is routed by signal paths 23 from the pixels 22 to inputs of parallel processing circuits 24 (e.g. ASICs) that are positioned next to the active sensor area. It should be understood that the term Application Specific Integrated Circuit (ASIC) is to be interpreted broadly as any general integrated circuit used and configured for a specific application. The ASICs process the electric charge generated from each x-ray and converts it to digital data which can be used to detect a photon and/or estimate the energy of the photon. The ASICs may be configured for connection to digital processing circuitry and/or memories located outside of the MCM and finally the data will be used as input for reconstructing an image.

The proposed technology generally relates to a photon-counting detector system with anti-coincidence logic that is controlled based on photon count information, wherein the resulting count measurements are smoothly varying functions of the input count rate.

The inventors have recognized that the probability of false coincidence increases with increasing count rate, corresponding to higher incident photon flux. The probability of false coincidence also increases with the range of the anti-coincidence logic, where the range is defined as the maximum distance between pixels that allows the anti-coincidence logic to identify pulses in the two pixels as belonging to the same original photon.

The proposed technology relates to a photon-counting x-ray detector system comprising a plurality of photon-counting readout channels, wherein at least two of the channels are connected to an adaptive anti-coincidence system configured to detect coincident events in the connected channels, wherein the operation of the anti-coincidence logic is adapted or controlled based on photon count information, and wherein the output of the detector system is a smoothly varying function of the input count rate.

The anti-coincidence system is sometimes referred to as anti-coincidence logic or anti-coincidence circuit.

By way of example, the operation of the anti-coincidence system may be varied in dependence on photon count information. In other words, the anti-coincidence system may be configured to be operated differently in dependence on photon count information.

For example, the operation may be adapted to the photon flux rate, e.g. based on measured or estimated photon count rates or based on the number of counts during a given period of time.

In other words, the photon count information may include information representative of an estimated photon count rate and/or information representative of the number of counts during a given period of time.

In a particular example, the operation of the anti-coincidence system is adapted in dependence on photon count information to be able to handle different incoming photon flux rates differently. In this way, a rate-adaptive anti-coincidence system is obtained.

In a particular example, the anti-coincidence system may be selectively enabled and/or disabled based on the photon count information.

For example, the anti-coincidence logic may be enabled at low count rates and disabled at higher count rates. In this way, the anti-coincidence logic may be active and give improved DQE at low count rates where the probability of registering a false coincidence is low. At high count rates, the ACL may be inactive/deactivated/disabled and therefore does not cause count loss due to false coincidence or degrade energy resolution. At high count rates, double counting degrades DQE to some extent since the anti-coincidence logic is not used. However, this DQE loss is minor and preferable to the severe degradation that would be caused by count loss if the anti-coincidence logic were enabled. This degradation of DQE on the noise level in the reconstructed image will in general only have a minor impact on the quality of the reconstructed image since the noise level in a CT image is dominated by the noisiest projection lines, i.e. the projection lines with the lowest photon count rate. A degradation of DQE at high count rates therefore does not affect the dominant contribution to the image noise.

The inventors have further recognized that an abrupt transition from active to inactive anti-coincidence logic may cause artifacts in the image, since the output count rate then changes abruptly at a certain input count rate, which can give rise to abrupt edges or streaks in the reconstructed image. By way of example, the anti-coincidence system may therefore be disabled gradually at high or increasing count rates, as will be exemplified later on. In other words, the transition from active to inactive anti-coincidence logic with increasing count rate may be gradual.

In a particular example, the anti-coincidence system may be implemented in a detector with multiple depth segments.

For example, the operation of the ACL in one depth segment of a considered detector pixel may be adapted in dependence on count information in another depth segment in the detector pixel, and/or count information in more than one depth segment in the detector pixel.

Figure 9:
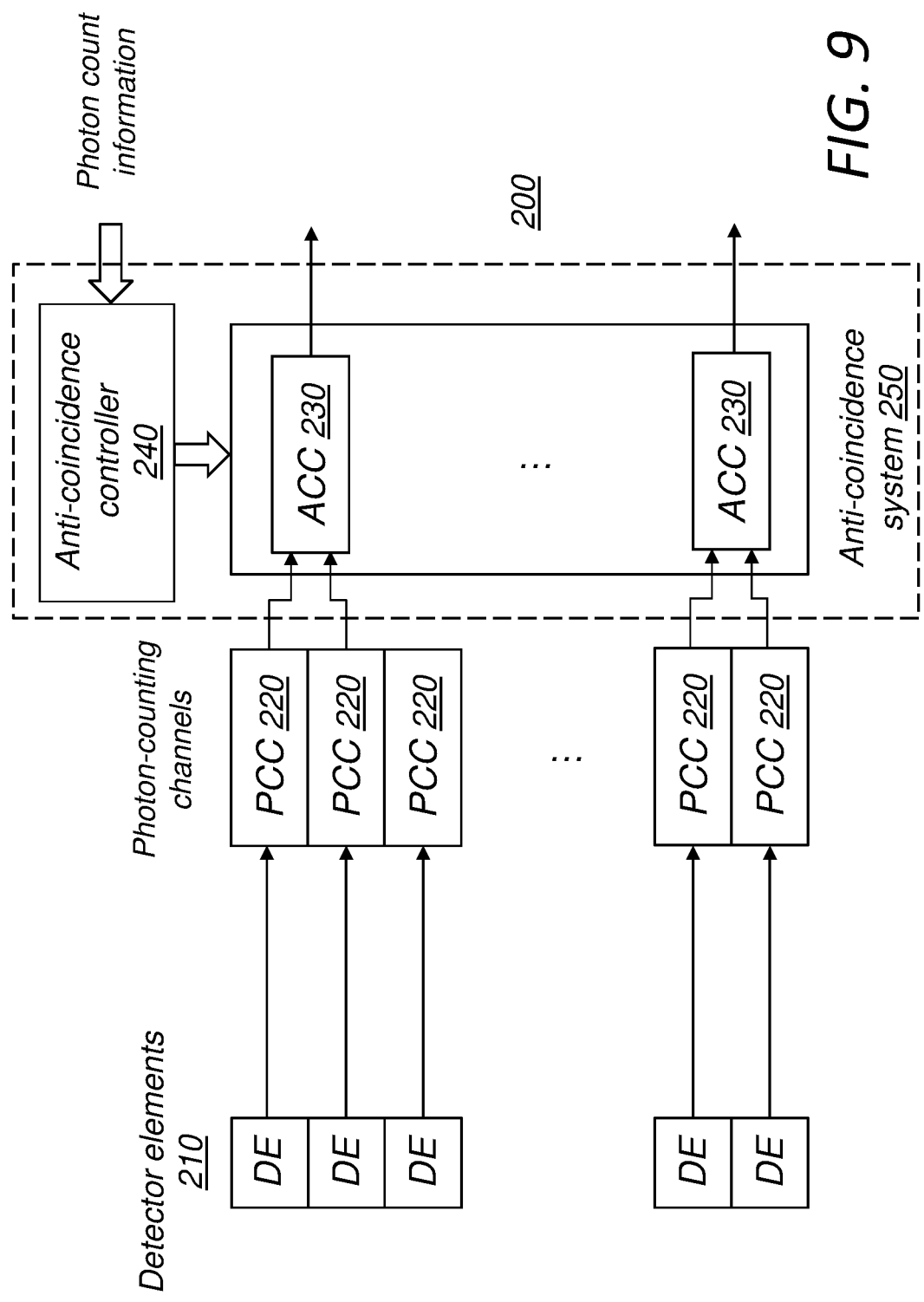
FIG. 9 is a schematic diagram, illustrating an example of a photon-counting x-ray detector system having a plurality of photon-counting channels and at least one anti-coincidence circuit and an associated anti-coincidence controller according to an embodiment.

FIG. 9 is a schematic diagram, illustrating an example of a photon-counting x-ray detector system having a plurality of photon-counting channels and at least one anti-coincidence circuit and an associated anti-coincidence controller according to an embodiment.

In this example, the photon-counting x-ray detector system 200 comprises a plurality of photon-counting channels 220, and at least one anti-coincidence circuit 230, each of which is connected to least two of the channels and configured to detect coincident events in the connected channels. The x-ray detector system further comprises an anti-coincidence controller 240 configured to control the operation of said at least one anti-coincidence circuit 230 based on photon count information by gradually adapting the operation of said at least one anti-coincidence circuit 230 with increasing count rates, starting from a threshold count rate.

Normally, each photon-counting channel 220 may be connected to a corresponding detector element 210, each of which typically has a charge collecting electrode.

By way of example, the anti-coincidence controller 240 may be configured to control the operation of said at least one anti-coincidence circuit by gradually disabling the anti-coincidence circuit(s) with increasing count rates, starting from a threshold count rate.

For example, the anti-coincidence controller may be configured to gradually disable the anti-coincidence circuit(s) with increasing count rates, starting from a threshold count rate and reaching a disabled state at a second threshold rate.

In a particular example, the anti-coincidence circuit is configured to detect coincident events in the connected channels based on a set of rules and/or settings relating to the pulse shape and time of incidence, wherein the set of rules and/or settings are gradually adapted with increasing count rates.

For example, the anti-coincidence controller may be configured to gradually adapt the set of rules and/or settings with increasing count rates to make the count-rate characteristic a smooth function.

As an example, the anti-coincidence controller may be configured to gradually increase the fraction of time during which the anti-coincidence circuit is disabled with increasing count rates.

For example, the anti-coincidence controller may be configured to gradually increase the fraction of time during which the anti-coincidence circuit is disabled per frame or per set of frames.

In a particular example, said at least one anti-coincidence circuit may be enabled in at least one channel during at least part of at least one frame and/or said at least one anti-coincidence circuit may be disabled in at least one channel in at least one frame.

Optionally, the anti-coincidence controller may be configured to gradually decrease the maximum time separation between events that allows the anti-coincidence circuit(s) to regard the events as originating from the same photon, with increasing count rates.

Alternatively, or as a complement, the anti-coincidence controller may be configured to gradually lower the fraction of events processed by the anti-coincidence circuit(s) with increasing count rates.

In a particular example, the anti-coincidence controller is configured to gradually reduce the neighborhood range of the anti-coincidence circuit with increasing count rates.

As an example, the x-ray detector system comprises a plurality of detector elements, each connected to a corresponding photon-counting channel, and the neighborhood range defines the maximum allowed distance between detector elements associated with connected channels of the anti-coincidence circuit.

A zero distance implies that the detector elements associated with connected channels of the anti-coincidence circuit are adjacent to each other, so-called nearest neighbors. A distance of one means that the detector elements or channels are second-nearest neighbors, with one detector element in-between, and so on.

Optionally, the anti-coincidence controller may be configured to gradually alter the estimation of total deposited photon energy with increasing count rates.

By way of example, the x-ray detector system 200 may comprise a plurality of detector elements 210, each connected to a corresponding photon-counting channel.

In a particular example, the x-ray detector system may be based on a depth-segmented, edge-on x-ray detector, in which each detector strip is sub-divided into at least two depth segments, each of which is configured as an individual detector element.

For example, a first anti-coincidence circuit connected to at least one depth segment of at least one detector strip may be configured to operate differently from a second anti-coincidence circuit connected to at least one other depth segment in the same detector strip, based on photon count information.

Optionally, the operation of an anti-coincidence circuit for at least one depth segment of at least one detector strip may be adapted or controlled based on photon count information of at least one other depth segment in the same detector strip and/or based on photon count information in a plurality of depth segments belonging to the same detector strip.

As an example, the photon count information may include information representative of an estimated photon count rate and/or information representative of the number of counts during a given period of time.

For example, the photon count information may be based on at least one count rate parameter, which is calculated from previously measured counts in at least one channel.

In a particular example, the anti-coincidence controller 240 is configured to gradually adapt the operation of an anti-coincidence circuit for a number of connected channels based on photon count information related to at least one other channel separate from the connected channels.

Preferably, said at least one anti-coincidence circuit may be configured to identify the channel of the original photon interaction and/or estimate the total energy of the original photon.

The proposed technology also relates to an anti-coincidence system 250 for a photon-counting x-ray detector system 200 having a plurality of photon-counting readout channels 220. The anti-coincidence system 250 comprises at least one anti-coincidence circuit 230, each of which is connected to least two of the channels and configured to detect coincident events in the connected channels. The anti-coincidence system 250 further comprises an anti-coincidence controller 240 configured to control the operation of said at least one anti-coincidence circuit 230 based on photon count information by gradually adapting the operation of said at least one anti-coincidence circuit with increasing count rates, starting from a threshold count rate.

In another aspect, the proposed technology also relates to a controller 240 for an anti-coincidence system 250 of a photon-counting x-ray detector system having a plurality of photon-counting readout channels 220. The anti-coincidence system 250 comprises at least one anti-coincidence circuit 230, each of which is connected to least two of the channels and configured to detect coincident events in the connected channels. The controller 240 is configured to control the operation of said at least one anti-coincidence circuit 230 based on photon count information by gradually adapting the operation of said at least one anti-coincidence circuit with increasing count rates, starting from a threshold count rate.

For a better understanding of certain aspects, the proposed technology will now be described with reference to particular, non-limiting examples.

Figure 10:
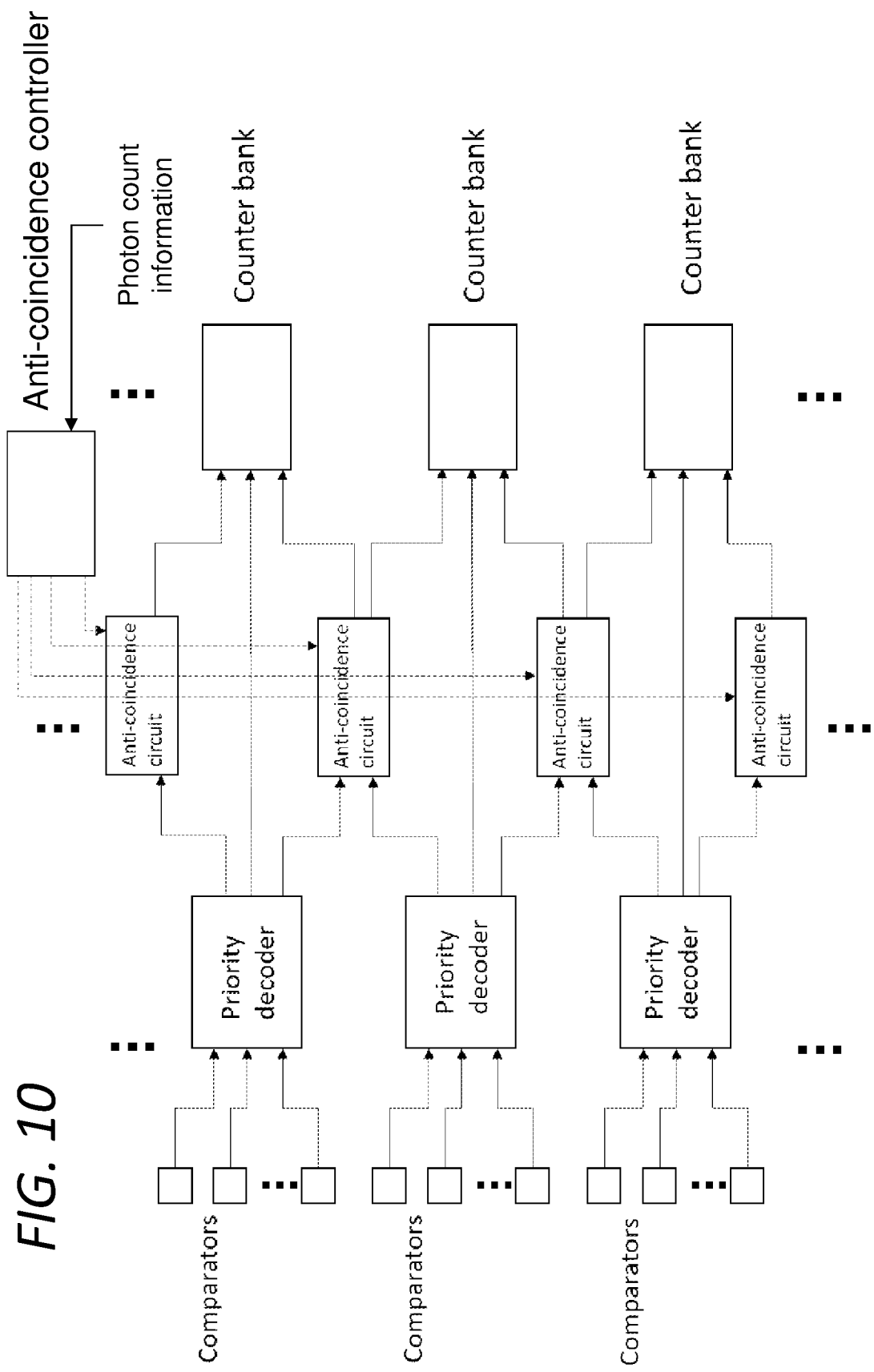
FIG. 10 is a schematic drawing illustrating another example of an anti-coincidence system implemented in a photon-counting x-ray detector system.

FIG. 10 is a schematic drawing illustrating another example of an anti-coincidence system implemented in a photon-counting x-ray detector system.

The signal value in each analog input signal channel is compared to one or more comparators, which compare the signal level to a predefined set of voltage thresholds. The digital output signal from the set of comparator(s) belonging to one analog input channel is transmitted to a priority decoder, which translates the set of comparator trigger signals to a digital value containing the number of the triggering comparator that corresponds to the highest threshold. The result is a digital value indicating the height of the pulse relative to the comparator threshold levels, and it will be referred to as a pulse-height value.

The pulse-height values from the priority decoders are transmitted to anti-coincidence circuits with the purpose of detecting and correcting for coincident pulses. In one embodiment of the invention, the anti-coincidence logic is used in a one-dimensional implementation. In this case, for every pair of neighboring detector channels an anti-coincidence circuit is provided, which receives the output pulse-height values from both channels in said pair of detector channels. Here and from now on, "neighboring channels" refers to channels which are connected to detector elements which are located next to each other, but may also be located in the same neighborhood although not adjacent to each other such as second-nearest neighbors.

In general, the photon interaction takes place in a detector element and the thus generated charge is collected by the corresponding electrode(s) of the detector element. Normally, a detector element is made up by a detector diode which has corresponding electrode(s).

In a preferred embodiment of the invention, the anti-coincidence circuit is programmed with a pre-configured time window setting, and detects if two pulses arrive in the two neighboring channels with a time difference less than or equal to this time delay. Using the information contained in the input signals from the two channels, such as the pulse-height values and the relative timing of the pulses, the anti-coincidence circuit determines whether the detected pulses come from the same original incident photon or not. If the pulses are identified as originating from the same photon, the anti-coincidence circuit assigns the event to one of the two neighboring channels and estimates the pulse height corresponding to the total energy deposited by the photon. Such a correction may take the form of a look-up table with two input signals: the pulse-height signals in each of the two neighboring channels, and one output signal: the estimated pulse-height signal corresponding to the total energy. Alternatively, the correction may take the form of a mathematical expression relating the output signal to the input signals, e.g. by letting the output be the sum of the input signals.

The anti-coincidence circuits may use a set of rules and/or settings to determine whether the event is a true or false coincidence, i.e. whether the detected pulses originate from the same photon or not. In one embodiment, these rules and/or settings may include comparing the sum of the two pulse heights to a predefined limit, classifying the event as a true coincidence if the sum is smaller than the limit and as a true coincidence otherwise. In another embodiment, these rules may include comparing the arrival times and pulse height of two detected pulses and classifying the event as a false coincidence if the pulse with larger pulse height arrived before the pulse with smaller height, and classifying it as a true coincidence otherwise. The anti-coincidence circuits may also use a set of rules to assign the interaction to a channel, where the original interaction is estimated to have taken place. In one embodiment, these rules may include assigning the event to the channel where the largest pulse height was detected. In another embodiment, the rules may include assigning the event to the channel where the pulse arrived earliest.

Furthermore, for each input signal channel there is a counter bank that includes one or more counters. The pulse-height signal for that signal channel, together with the output signals from the anti-coincidence circuits of the two neighbor pairs that the channel belongs to, are transmitted to the counter bank. Based on these signals, one or more counters in the counter bank are incremented. In a preferred embodiment, for every comparator there is a counter in the counter bank that, if there are no coincident events, counts the number of incident pulses in the channel with a pulse height between the threshold level of said comparator and the threshold level of the following comparator in order of increasing threshold. In case there are coincident events detected on neighboring channels, the output of the anti-coincidence circuit is modified accordingly, so that only one counter is incremented for every registered photon and so that the incremented counter is the one corresponding to the estimated total deposited photon energy. Specifically, upon arrival of coincident pulses on two neighboring channels, the event will be registered in one of the channels, namely the one that the event is assigned to by the anti-coincidence circuit corresponding to these two channels. Also, the output of the logic, e.g. a lookup table, gives the number of the counter that is incremented in the counter bank of that channel.

The above description typically relates to an implementation where the anti-coincidence correction is performed in one dimension. Such an implementation is useful in a detector design where charge sharing and other effects causing cross-talk between detector elements takes place predominantly in one dimension. Examples of such detectors include silicon strip detectors oriented with their edge directed towards the beam. In such a detector, the charge-sharing may take place predominantly in one dimension even if the detector is depth-segmented, if the depth segment lengths are large compared to the charge carrier cloud size. In this case, an anti-coincidence circuit is included between neighboring detector elements in the same depth segment level. The anti-coincidence logic may also be implemented in a two-dimensional geometry by including an anti-coincidence circuit between any/every pair of neighboring pixels sharing a common pixel border.

The anti-coincidence logic can also be implemented in other ways, for example by also including anti-coincidence circuits between pixels sharing a common corner, and potentially also between pixels separated even further apart. A similar scheme can also be implemented in a three-dimensional pixel array, such as a depth-segmented detector, by implementing anti-coincidence circuits between neighboring/adjacent detector elements in all three dimensions. In another exemplary embodiment, the anti-coincidence circuits may receive pulse-height signals from three or more channels, so that events occurring simultaneously on three or more channels may be detected and corrected.

In another embodiment of the invention, the anti-coincidence circuits are directly connected to the comparator output signals, without priority decoders in between. In yet another embodiment of the invention, the anti-coincidence logic is implemented in such a way that the anti-coincidence circuits use the analog signals directly as inputs, without comparators and priority decoders in between. This allows the anti-coincidence circuits to use an analog summation circuit to calculate the total pulse height as the sum of the pulse heights of the different channels that detect pulses.

In one aspect of the invention, the detector logic contains an anti-coincidence control unit that senses the count rate in each frame and adapts the operation of the anti-coincidence logic as a function of one or more count information parameters. Such a count information parameter may be either individual for each readout channel or common for a plurality of readout channels, where in the latter case the total counts in all the affected readout channels may be used to control the operation of the anti-coincidence logic.

The output count rate measured by the detector is the number of registered counts per frame divided by the frame time. This may be different from the input count rate, i.e. the actual rate of interactions in the detector material. The relationship between the expectation value of the input count rate and the expectation value of the output count rate in a photon-counting detector is referred to as a count-rate characteristic. The term "expectation value" is here used in the sense of probability theory, i.e. the input and output count rates are viewed as random variables. In the presence of pile-up, the count-rate characteristic is non-linear.

Figures 11A, 11B, 11C:
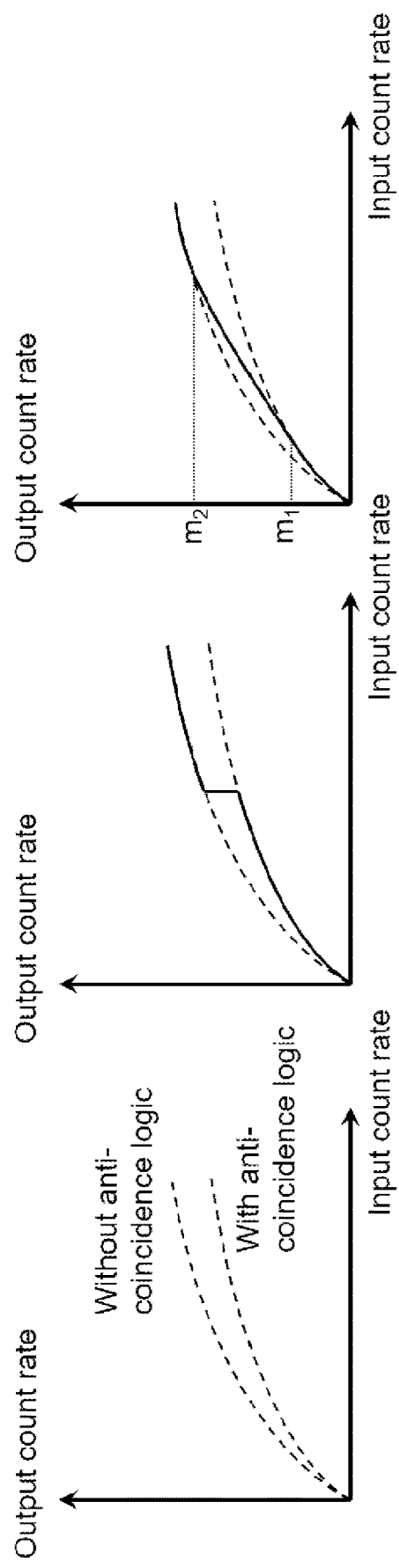
FIG. 11A-C are schematic curve diagrams showing examples of count-rate characteristics of detectors with and without anti-coincidence logic, and with the proposed rate-dependent anti-coincidence logic.

FIG. 11A shows the count-rate characteristic for a detector with and without anti-coincidence logic. The anti-coincidence logic decreases the count rate by removing coincident counts and therefore decreases the output count rate for a given input count rate.

If the anti-coincidence logic is disabled abruptly, at a certain count rate, the count rate characteristic will be discontinuous, as shown in FIG. 11B. At said count rate, the input-output characteristic jumps from the lower curve, which applies to a detector with anti-coincidence logic, to the upper curve, which applies to a detector without anti-coincidence logic. Such a rapid change in detector response may give rise to artifacts in the image.

To reduce artifacts, it is desirable to have a count-rate characteristic that is smoothly varying. In general, it is desirable that all count values measured by the detector are smoothly varying functions of the input count rate. In this context, a smooth function, or a smoothly varying function, is a function whose output variable does not vary too rapidly with the input variable, with respect to the intended application. The requirements for a function to be smooth may thus be different in different applications.

By way of example, a count-rate characteristic may be regarded as smooth if it is a continuous function. In another example, a count-rate characteristic may be regarded as smooth if it is a differentiable function. In yet another example, a count-rate characteristic may be regarded as smooth even if it is discontinuous at a number of points, provided that the discontinuities are small enough not to give visible artifacts in the image.

In a particular example of the present invention, a method is provided for disabling the anti-coincidence logic gradually within a range of count rates. More specifically, the fraction of coincident events removed by the anti-coincidence logic is reduced to zero gradually as the count rate increases, thereby obtaining a detector whose input-output count rate characteristic is smooth.

An example of such a count-rate characteristic is shown in FIG. 11C. In an exemplary embodiment, the anti-coincidence logic is enabled during the entirety of each frame for output count rates lower than a first threshold count rate $m_1$.

For output count rates higher than the first threshold count rate $m_1$ and lower than a second threshold count rate $m_2$, the anti-coincidence logic is disabled during part of each frame and enabled during the rest of the frame. Between output count rates $m_1$ and $m_2$, the fraction of each frame during which the anti-coincidence logic is disabled is an increasing function of the output count rate. In this example, for count rates larger than the second threshold count rate $m_2$, the anti-coincidence logic is constantly kept in a disabled state.

U.S. Pat. No. 9,207,332 relates to a specialized detector configuration with two modes, one where the charges are summed prior to digitization and one where the counts is summed after digitization.

US Patent Application 2016/0282476 relates to an x-ray detector with two counting modes, where a first count measurement in a first counting mode is used to control a second count measurement in a second counting mode.

Neither of these two examples of prior art discloses an anti-coincidence system that is turned off gradually with increasing count rate. Also, neither of these two examples of prior art discloses an anti-coincidence logic that may be adapted for particular use with a depth-segmented detector.

In another embodiment of the invention, the anti-coincidence logic may be disabled during a fraction $f$ of the frame given by a mathematical function $f(m)$ of the output count rate m. In a preferred embodiment, this function may be smooth and monotonically increasing from 0 to 1, for example $$f(n) = 0.5 \cdot \left(1 + \text{erf} \frac{m - m_t}{\sigma \sqrt{2}}\right)$$

where $nm_t$ is a threshold output count rate and $\sigma$ is a parameter controlling the transition smoothness. In another embodiment, the function $f(m)$ may assume values between $f_1$ and $f_2$ for all count rates, where one of the conditions $f_1 > 0$ and $f_2 < 1$ or both may be true, so that the anti-coincidence logic is either enabled during part of the frame time for all count rates, or always disabled during part of the count rate, or both.

In another embodiment of the invention, the anti-coincidence logic is enabled during a subset of the acquired frames and disabled during the other frames, where said subset of frames depends on the count rate. For example, the anti-coincidence logic can be enabled during every frame at low count rates, enabled during every second frame at intermediate count rates and disabled during every frame at high count rates.

In yet another embodiment of the invention, the measured count rate is averaged over several frames before being used for controlling the anti-coincidence logic. This may be implemented by continuously calculating a moving average of a specified number of the most recently acquired frames. This moving average is then taken as input by the anti-coincidence logic control circuit in order to determine when the anti-coincidence logic should be enabled and when it should be disabled. In this way, the effect of statistical fluctuations in the measured count rate on the anti-coincidence logic is reduced.

In still another embodiment of the invention, a counter is provided for each anti-coincidence circuit that counts the number of true coincidences that has been detected in that anti-coincidence circuit. Once said counter reaches a certain threshold value, said anti-coincidence logic pair is disabled so that it no longer corrects for coincidence events. With the start of each frame, the counter is reset so that the anti-coincidence circuit is enabled again until the counter reaches the threshold value. In this way, the anti-coincidence logic will be active for the entire frame for low count rates but only during a fraction of the frame for high count rates. The threshold may either be a fixed pre-programmed value or a function of the incident count rate.

In another embodiment of the invention, the anti-coincidence may or may not process each event, depending on a random selection with a certain probability, where said probability is varied with photon count information such as the count rate or the number of previously registered count within a certain time period.

In another aspect of the invention, the time window length of the anti-coincidence logic, which determines the maximum time separation between events that allows the anti-coincidence logic circuit to regard them as originating from the same photon, is varied depending on the measured incident count rate. In one embodiment of the invention, the time window length is equal to a first value $t_1$ for output count rates less than $m_1$ and a second value $t_2$ for output count rates greater than $m_2$. Between $m_1$ and $m_2$ the time window is equal to $t_1$ for a fraction $f$ of each frame and equal to $t_2$ for the remainder of each frame, where $f$ increases smoothly from 0 to 1 between output count rates $m_1$ and $m_2$. For example $t_2$ can be chosen less than $t_1$, which means that the time window decreases with increasing output count rate. Decreasing the time window length decreases the false coincidence rate, meaning that the scheme described here mitigates the DQE degradation due to false coincidence at high count rates.

In yet another aspect of the invention, the anti-coincidence logic is endowed with at least one range parameter that affects the range of the anti-coincidence logic, and said range parameter(s) are taken to be functions of the input count rate. In one embodiment, the anti-coincidence logic may act on nearest-neighboring and second-nearest-neighboring channel pairs (i.e. channel pairs connected to electrodes with at most one electrode in between them) for low photon fluxes, but only on nearest-neighboring electrodes for high photon fluxes. For intermediate photon fluxes the anti-coincidence logic acts on nearest-neighbor and second-nearest-neighbor pairs during part of each frame and only on nearest-neighbor frames during the rest of each frame.

In still another aspect of the invention, the algorithm for estimating the total deposited energy may be gradually altered as a function of the count rate, e.g. gradually altered with increasing count rates. Specifically, if a look-up table is used to generate an output pulse-height value from at least two input pulse-height values, the values in said look-up table may be taken to be functions of deposited energy. This allows adjusting the look-up table to reproduce the estimated total photon energy more accurately for a range of different count rates. In particular, this may mitigate the detrimental effects of spectral distortion caused by pile-up on the function of the anti-coincidence logic. At high count rates, pile-up may cause distortion of the detected energy spectrum, since the total height of two pulses arriving simultaneously in the same channel is measured. By taking this into account in the estimation of original photon energy in the anti-coincidence logic circuit, the initial photon energy may be reproduced more accurately.

In another aspect of the invention, the anti-coincidence logic connected to one detector pixel may be controlled or adapted based on count information in one or more other detector pixels. For example, the anti-coincidence logic connected to a first detector pixel may be adapted based on the count rate in neighboring pixels, for example to start a gradual reduction of the anti-coincidence system when neighboring detector pixels reach a certain threshold count rate even though the first detector pixel has not reached said threshold count rate. This may allow the count-rate characteristic to become smoother.

In another aspect of the invention, the anti-coincidence logic system may be used together with a depth-segmented detector, in which each detector strip (pixel) is subdivided into a plurality of depth segments along the intended x-ray beam direction. By way of example, the operation of the anti-coincidence logic may be different in the different depth segments. In particular, the anti-coincidence logic may be adapted by letting it be turned on for a fraction of each frame, where said fraction is a function of count rate, as previously discussed. In this case, the anti-coincidence logic may be active during different frame times in different depth segments. Since the total count number detected in the detector pixel is the sum of the count number in the depth segments, this makes the total number of counts in all depth segments a smoother function of input count rate than what would have been possible with only one depth segment. In situations where a smooth decrease in the anti-coincidence logic activity is hard to implement, for example in systems where the time fraction during which the anti-coincidence logic system is active can only be set to a discrete number of values.

In another aspect of the invention, the usage of a depth-segmented detector can also be beneficial in other ways for the disclosed anti-coincidence logic system. For example, the operation of an anti-coincidence circuit for at least one depth segment of at least one detector strip may be adapted or controlled based on photon count information of at least one other depth segment in the same detector strip and/or based on photon count information in a plurality of depth segments belonging to the same detector strip. In other words, the count information obtained in one or more depth segments of one detector strip/pixel may be used to control or adapt anti-coincidence logic connected to one of the depth segments, or to a subset of the depth segments, or in another depth segment of the same detector strip/pixel. For example, the total number of counts registered in all depth segments of one detector pixel may be used to control the anti-coincidence logic connected to one of the depth segments in the same detector pixel. In this way, more photon statistics is available to the anti-coincidence control logic and the influence of quantum noise on the anti-coincidence operation is thereby decreased. This reduces the risk that the anti-coincidence logic is turned on and off randomly because of quantum noise.

In another example, the anti-coincidence logic connected to one depth segment which measures lower count rate in general may be adapted based upon one or more other depth segments in the same detector strip/pixel which measure higher count rates, thereby reducing the influence of quantum noise.

In another example, the anti-coincidence logic connected to one depth segment which measures higher count rate in general may be adapted based upon one or more other depth segments in the same detector strip/pixel which measure lower count rates. In this way, the anti-coincidence logic may for example be controlled based on the count rate in a depth segment in which the anti-coincidence logic is constantly turned on in the relevant range of photon flux rates. In this way, the rapid change in output count rate when the anti-coincidence logic is turned off or switches from one mode to another does not feed back into the anti-coincidence control logic, where it could otherwise complicate the control algorithm.

It will be appreciated that the mechanisms and arrangements described herein can be implemented, combined and re-arranged in a variety of ways.

For example, embodiments may be implemented in hardware, or at least partly in software for execution by suitable processing circuitry, or a combination thereof.

The steps, functions, procedures, and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, and/or blocks described herein may be implemented in software such as a computer program for execution by suitable processing circuitry such as one or more processors or processing units.

FIG. 12 is a schematic diagram illustrating an example of a computer-implementation 300 according to an embodiment. In this particular example, at least some of the steps, functions, procedures, modules and/or blocks described herein are implemented in a computer program 325; 335, which may be loaded from an external memory device 330 into the memory 320 for execution by processing circuitry including one or more processors 310. The processor(s) 310 and memory 320 are interconnected to each other to enable normal software execution. An optional input/output device 340 may also be interconnected to the processor(s) 310 and/or the memory 320 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

Examples of processing circuitry includes, but is not limited to, one or more microprocessors, one or more Digital Signal Processors (DSPs), one or more Central Processing Units (CPUs), and/or any suitable programmable logic circuitry such as one or more Field Programmable Gate Arrays (FPGAs), or one or more Programmable Logic Controllers (PLCs).

The processing circuitry including one or more processors 310 is thus configured to perform, when executing the computer program 325, well-defined processing tasks such as those described herein.

By way of example, the software or computer program 325; 335 may be realized as a computer program product, which is normally carried or stored on a computer-readable medium 320; 330, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

More specifically, the computer-program product comprises a computer-readable medium 320, 330 having stored thereon a computer program 325, 335 for controlling, when executed by a processor, an anti-coincidence system of a photon-counting x-ray detector system having a plurality of photon-counting readout channels, wherein the anti-coincidence system comprises at least one anti-coincidence circuit, each of which is connected to least two of the channels and configured to detect coincident events in the connected channels. The computer program comprises instructions, which when executed by the processor, cause the processor to control the operation of said at least one anti-coincidence circuit based on photon count information by gradually adapting the operation of said at least one anti-coincidence circuit with increasing count rates, starting from a threshold count rate.

It should also be understood that it may be possible to re-use the general processing capabilities of any conventional device or unit in which the proposed technology is implemented. It may also be possible to re-use existing software, e.g. by reprogramming of the existing software or by adding new software components.

The extent of software versus hardware is purely an implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A photon-counting x-ray detector system comprising:
a plurality of photon-counting channels, and
an anti-coincidence circuit, which is connected to least two of the channels and configured to detect coincident events in the connected channels,
wherein the x-ray detector system further comprises an anti-coincidence controller configured to control the operation of said anti-coincidence circuit based on photon count information to provide a rate-adaptive anti-coincidence system configured to be operated differently in dependence on said photon count information, and
wherein said anti-coincidence controller is configured to control the operation of said anti-coincidence circuit by gradually adapting the operation of and gradually limiting the influence of said anti-coincidence circuit with increasing count rates, starting from a threshold count rate, with a gradual transition from one state of operation to another.

2. The photon-counting x-ray detector system of claim 1, wherein the anti-coincidence controller is configured to control the operation of said anti-coincidence circuit by gradually limiting the influence of the anti-coincidence circuit with increasing count rates, starting from a threshold count rate.

3. The photon-counting x-ray detector system of claim 2, wherein the x-ray detector system has a count rate characteristic, and the anti-coincidence controller is configured to gradually limit the influence of the anti-coincidence circuit with increasing count rates to make the count rate characteristic a continuous function.

4. The photon-counting x-ray detector system of claim 1, wherein the anti-coincidence circuit is configured to detect coincident events in the connected channels based on a set of rules and/or settings relating to pulse shape and time of incidence, wherein the set of rules and/or settings are gradually adapted with increasing count rates.

5. The photon-counting x-ray detector system of claim 1, wherein the anti-coincidence controller is configured to operate based on a maximum time separation between events that allows the anti-coincidence circuit to regard the events as originating from the same photon, and to gradually decrease the maximum time separation with increasing count rates.

6. The photon-counting x-ray detector system of claim 1, wherein the anti-coincidence controller is configured to gradually lower the fraction of events processed by the anti-coincidence circuit with increasing count rates.

7. The photon-counting x-ray detector system of claim 1, wherein the x-ray detector system comprises a plurality of detector elements, each connected to a corresponding photon-counting channel, and the anti-coincidence controller is configured to gradually reduce a maximum allowed distance between detector elements associated with connected channels of the anti-coincidence circuit with increasing count rates.

8. The photon-counting x-ray detector system of claim 1, wherein the anti-coincidence controller is configured to gradually alter the estimation of total deposited photon energy with increasing count rates.

9. The photon-counting x-ray detector system of claim 1, wherein the x-ray detector system comprises a plurality of detector elements, each connected to a corresponding photon-counting channel.

10. The photon-counting x-ray detector system of claim 9, wherein the x-ray detector system is based on a depth-segmented, edge-on x-ray detector, in which each detector strip is sub-divided into at least two depth segments, each of which is configured as an individual detector element.

11. The photon-counting x-ray detector system of claim 10, wherein a first anti-coincidence circuit connected to at least one depth segment of at least one detector strip is configured to operate differently from a second anti-coincidence circuit connected to at least one other depth segment in the same detector strip, based on photon count information.

12. The photon-counting x-ray detector system of claim 10, wherein the operation of an anti-coincidence circuit for at least one depth segment of at least one detector strip is adapted or controlled based on photon count information of at least one other depth segment in the same detector strip and/or based on photon count information in a plurality of depth segments belonging to the same detector strip.

13. The photon-counting x-ray detector system of claim 1, wherein said photon count information includes information representative of an estimated photon count rate and/or information representative of the number of counts during a given period of time.

14. The photon-counting x-ray detector system of claim 13, wherein the photon count information is based on at least one count rate parameter, which is calculated from previously measured counts in at least one channel.

15. The photon-counting x-ray detector system of claim 1, wherein the anti-coincidence controller is configured to gradually adapt the operation of an anti-coincidence circuit for a number of connected channels based on photon count information related to at least one other channel separate from the connected channels.

16. The photon-counting x-ray detector system of claim 1, wherein said anti-coincidence circuit is configured to identify the channel of the original photon interaction and/or estimate the total energy of the original photon.

17. An anti-coincidence system for a photon-counting x-ray detector system having a plurality of photon-counting readout channels, wherein the anti-coincidence system comprises an anti-coincidence circuit, which is connected to least two of the channels and configured to detect coincident events in the connected channels, wherein the anti-coincidence system further comprises an anti-coincidence controller configured to control the operation of said anti-coincidence circuit based on photon count information to provide a rate-adaptive anti-coincidence system configured to be operated differently in dependence on said photon count information, and wherein said anti-coincidence controller is configured to control the operation of said anti-coincidence circuit by gradually adapting the operation of and gradually limiting the influence of said anti-coincidence circuit with increasing count rates, starting from a threshold count rate, with a gradual transition from one state of operation to another.

18. A controller for an anti-coincidence system of a photon-counting x-ray detector system having a plurality of photon-counting readout channels, wherein the anti-coincidence system comprises an anti-coincidence circuit, which is connected to least two of the channels and configured to detect coincident events in the connected channels, wherein the controller is configured to control the operation of said anti-coincidence circuit based on photon count information to provide a rate-adaptive anti-coincidence system configured to be operated differently in dependence on said photon count information, and wherein said anti-coincidence controller is configured to control the operation of said anti-coincidence circuit by gradually adapting the operation of and gradually limiting the influence of said anti-coincidence circuit with increasing count rates, starting from a threshold count rate, with a gradual transition from one state of operation to another.

19. A non-transitory computer-readable medium having stored thereon a computer program for controlling, when executed by a processor, an anti-coincidence system of a photon-counting x-ray detector system having a plurality of photon-counting readout channels, wherein the anti-coincidence system comprises an anti-coincidence circuit, which is connected to least two of the channels and configured to detect coincident events in the connected channels, wherein the computer program comprises instructions, which when executed by the processor, cause the processor to control the operation of said anti-coincidence circuit based on photon count information to provide a rate-adaptive anti-coincidence system configured to be operated differently in dependence on said photon count information, wherein the computer program comprises instructions, which when executed by the processor, cause the processor to control the operation of said anti-coincidence circuit by gradually adapting the operation of and gradually limiting the influence of said anti-coincidence circuit with increasing count rates, starting from a threshold count rate, with a gradual transition from one state of operation to another.

* * * * *